United States Patent
Ganapathy et al.

(10) Patent No.: US 9,642,046 B2
(45) Date of Patent: May 2, 2017

(54) COMMUNICATION SYSTEM

(71) Applicants: Suresh Ganapathy, Tokyo (JP); Jagdeep Singh Ahluwalia, Tokyo (JP); Neeraj Gupta, Tokyo (JP); Kenji Kawaguchi, Tokyo (JP)

(72) Inventors: Suresh Ganapathy, Tokyo (JP); Jagdeep Singh Ahluwalia, Tokyo (JP); Neeraj Gupta, Tokyo (JP); Kenji Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/362,103

(22) PCT Filed: Nov. 15, 2012

(86) PCT No.: PCT/JP2012/080252
§ 371 (c)(1),
(2) Date: May 30, 2014

(87) PCT Pub. No.: WO2013/084722
PCT Pub. Date: Jun. 13, 2013

(65) Prior Publication Data
US 2014/0370896 A1 Dec. 18, 2014

(30) Foreign Application Priority Data
Dec. 6, 2011 (GB) .................................. 1120969.9

(51) Int. Cl.
*H04W 36/00* (2009.01)
*H04W 28/08* (2009.01)
(Continued)

(52) U.S. Cl.
CPC ....... *H04W 36/0055* (2013.01); *H04W 28/08* (2013.01); *H04W 36/08* (2013.01);
(Continued)

(58) Field of Classification Search
CPC ............ H04W 36/0055; H04W 36/08; H04W 52/0209; H04W 28/08; H04W 84/045; H04W 88/10
(Continued)

(56) References Cited

U.S. PATENT DOCUMENTS 8,447,314 B2 * 5/2013 Grayson ............... H04W 16/04
455/452.1
2007/0058553 A1 * 3/2007 Antal et al. .................... 370/248
(Continued)

FOREIGN PATENT DOCUMENTS

CA 2 796 367 A1 11/2011
CN 102170676 A 8/2011
(Continued)

OTHER PUBLICATIONS

Japanese Office Action dated Apr. 15, 2015 with partial English translation.
(Continued)

*Primary Examiner* — Wayne Cai
(74) *Attorney, Agent, or Firm* — McGinn IP Law Group, PLLC.

(57) ABSTRACT

A communication system in which an availability of communication resources to be used by a first base station module and a second base station module of a communications apparatus is managed. In one embodiment, the communication resources are shared between first and second base station modules such that communication resources that are not being used by the first base station module are available to be used by the second base station module and vice versa.

25 Claims, 7 Drawing Sheets

(51) Int. Cl.
*H04W 36/08* (2009.01)
*H04W 52/02* (2009.01)
*H04W 84/04* (2009.01)
*H04W 88/10* (2009.01)

(52) U.S. Cl.
CPC ...... *H04W 52/0209* (2013.01); *H04W 84/045* (2013.01); *H04W 88/10* (2013.01)

(58) Field of Classification Search
USPC .................. 455/436–439, 444–446, 442, 453
See application file for complete search history.

(56) References Cited

U.S. PATENT DOCUMENTS

| | | | |
|---|---|---|---|
| 2009/0215452 A1 | 8/2009 | Balasubramanian et al. | |
| 2009/0225689 A1* | 9/2009 | Yu ........................ | H04W 72/04 370/310.2 |
| 2010/0009695 A1* | 1/2010 | Kwon et al. .............. | 455/452.2 |
| 2010/0074187 A1 | 3/2010 | Sun et al. | |
| 2010/0075692 A1 | 3/2010 | Busschbach et al. | |
| 2010/0099431 A1 | 4/2010 | Sampath et al. | |
| 2010/0190533 A1* | 7/2010 | Black .................... | H04W 24/04 455/571 |
| 2010/0254344 A1* | 10/2010 | Wei et al. .................... | 370/330 |
| 2010/0273468 A1 | 10/2010 | Bienas et al. | |
| 2011/0009145 A1* | 1/2011 | Pirinen ........................ | 455/509 |
| 2011/0261683 A1 | 10/2011 | Nitta et al. | |
| 2012/0002632 A1* | 1/2012 | Takagi .............. | H04W 72/0426 370/329 |
| 2012/0058765 A1 | 3/2012 | Choi | |
| 2012/0307713 A1 | 12/2012 | Watanabe et al. | |
| 2013/0130647 A1* | 5/2013 | Zhu .............................. | 455/410 |

FOREIGN PATENT DOCUMENTS

| | | |
|---|---|---|
| FR | 2 868 634 A1 | 10/2005 |
| GB | 2 454 872 A | 5/2009 |
| JP | 2009-508418 A | 2/2009 |
| JP | 2010-187159 A | 8/2010 |
| JP | 2011-234028 A | 11/2011 |
| JP | 2012-503942 A | 2/2012 |
| WO | WO 2007/031116 A1 | 3/2007 |
| WO | WO 2010/036535 A1 | 4/2010 |
| WO | WO 2011/074624 A1 | 6/2011 |

OTHER PUBLICATIONS

International Search Report in PCT/JP2012/080252 dated Mar. 15, 2013 (English Translation Thereof).

3 GPP TS 36.413 v10.3.0 (Sep. 2011) 3$^{rd}$ Generation Partnership Project; Technical Specification Group Radio Access Network; Evolved Universal Terrestrial Radio Access Network (E-UTRAN);S1 Application Protocol (S1AP) (Release 10).

3 GPP TS 48.018 v10.3.0 (Sep. 2011) 3rd Generation Partnership Project; Technical Specification Group GSM/EDGE Radio Access Network; General Packet Radio Service (GPRS);Base Station System (BSS)—Serving GPRS Support Node (SGSN);BSS GPRS Protocol (BSSGP)(Release 10).

China Mobile, "Admission control in hybrid mode due to shortage of resource", 3GPP Draft; S2-093096, 3GPP TSG SA WG2 Meeting # 73, May 11-15, 2009, Tallinn, Estonia.

Japanese Office Action dated Aug. 17, 2016 and English translation of relevant part of Japanese Office Action.

Japanese Office Action dated Dec. 24, 2015 with partial English translation.

* cited by examiner

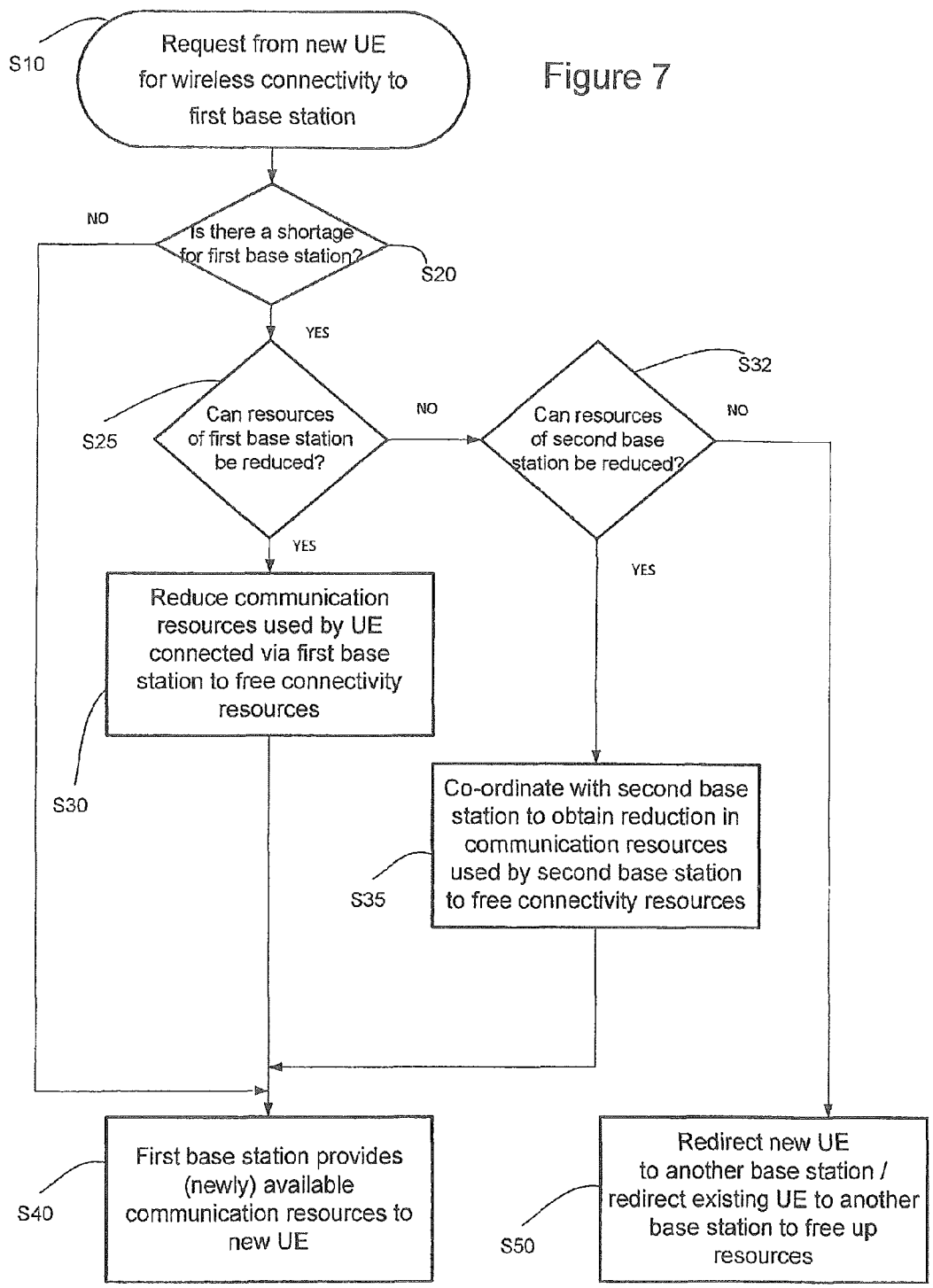

US 9,642,046 B2

COMMUNICATION SYSTEM

TECHNICAL FIELD

The present invention relates to mobile telecommunication networks and to parts thereof, particularly but not exclusively, networks operating according to the 3rd Generation Partnership Project (3GPP) standards or equivalents or derivatives thereof. The invention has particular although not exclusive relevance to the backhaul bandwidth of home base stations in these networks.

BACKGROUND ART

Under the 3GPP standards, a NodeB (or an eNB in LTE (i.e. Long Term Evolution)) is the home base station part via which mobile devices connect to the core network and which defines a cell of the network. Home base stations or home base station parts (HNB) provide short range 3G radiofrequency (RF) coverage, and are sometimes referred to as a femto access point (FAP). Where the home base station is operating in accordance with the LTE standards, the HNB is commonly referred to as an HeNB. Some base stations, sometimes referred to as HNB/HeNB, can operate in accordance with both the 3G and LTE standards, and therefore define a dual mode femtocell. The HNB/HeNB base station may also sometimes be referred to as a dual mode femto access point (FAP) or dual FAP.

The HNB or HeNB provides radio coverage (for example, 3G, 4G and/or WiMAX) within the home, small or medium enterprise, shopping malls, etc. and typically connects to the core network via a suitable residential gateway RG and public or corporate broadband (BB) access network (for example via an ADSL link to the Internet) to provide the HNB or HeNB with a backhaul communication line or link with an available bandwidth. The HNB or HeNB is given an IP address by the local network to which it is connected, and the HNB or HeNB provides this IP address to the mobile telephone operator network so that it can reserve appropriate resources for the HNB or HeNB through the broadband access network.

During operation in a normal operation mode or normal state, the HNB or HeNB enables users of a User Equipment (UE) to communicate with other such users via one of a number of the base stations (eNodeB, eNB) and a core network.

In a connected or active state or mode, a UE is registered with the network and has an RRC (Radio Resource Control) connection with a base station, so that the network can identify which cell the UE belongs to and can transmit data to and receive data from the UE. In LTE, in the active state or mode, the Handover procedure allows UEs to have service continuity while moving within the Intra LTE system (Intra RAT and Inter Frequency) and towards other RATS (Radio Access Technologies).

A UE also has a power conservation or idle state or mode in which, typically, the UE is not transmitting or receiving data, and no context about the UE is stored by the base station. In the idle state, the location of the UE is known only (to the MME (Mobility Management Entity) in 3GPP) at the granularity of a Tracking Area (TA) comprising a cluster or group of base station cells. When in the idle state, a UE selects and reselects cells according to the parameters broadcast by the base station in the BCH (Broadcast Channel), with a frequency given by a Tracking Area Update Timer Value, and the base station is not aware of the cell selections/reselections made by the UE.

During the normal operation mode, the HNB or HeNB usually periodically broadcasts a downlink transmission comprising reference signals and system information, for instance both the Pilot and the Broadcast Channels, to signal its presence to UEs.

In dual mode cells, both the baseband and the radiofrequency processing hardware blocks of the HeNB are independent from the baseband and the radiofrequency processing hardware blocks of the HNB.

To be able to admit new UE (sometimes referred to as radio bearers), a base station (for instance an HeNB of a dual FAP) should have aggregate communication traffic which does not exceed the available backhaul bandwidth (also referred to as Transport Network Layer (TNL) resources) in the uplink and/or downlink directions. If the aggregate traffic of the base station might exceed the available backhaul bandwidth in the uplink and/or downlink directions if a UE is admitted, then the UE or bearer might need to be handed over or redirected to a macro cell even when operation in the dual FAP is preferred, for example to reduce costs to an end user who is a member of a closed subscriber group associated with the base station. Furthermore, since a femto cell operator may not also manage the macro cell network, the handing over of the UE or bearer to a macro cell may result in a loss in revenue to the femto cell operator and an increase costs to the end user.

SUMMARY OF THE INVENTION

Exemplary embodiments of the present invention address or at least ameliorate the above issue.

According to one aspect, the invention provides a communications apparatus comprising: a first base station module for providing wireless communication to a communications network to at least one mobile communications device within range of the first base station module; a second base station module for providing wireless communication to a communications network to at least one mobile communications device within range of the second base station module; a network interface to a communications network, for providing communication resources of the communications network to the first and second base station modules over a communication link; and means for managing an availability of the communication resources, over the communication link, to be used by said first base station module and said second base station module for providing said wireless communication to the communications network to the at least one mobile communications device.

The managing means may share said communication resources between said first and second base station modules such that communication resources that are not being used by the first base station module are available to be used by the second base station module and vice versa.

When there is a shortage of communication resources over the communication link for at least one of the first and second base station modules to provide wireless communication to the network to at least one further mobile communications device, the managing means may be configured to manage the communication resources of the said at least one of the first and second base station modules, to reduce current communication resources used by the said at least one of the first and second base station modules over the link, to free communication resources whereby said at least one of the first and second base station modules is able to provide wireless communication to the said at least one further mobile communications device using the freed communication resources.

When there is a shortage of communication resources over the communication link for at least one of the first and second base station modules to provide wireless communication to at least one further mobile communications device, the managing means may be configured to control the communication resources of the other one of the first and second base station modules, to reduce current communication resources used by the said other one of the first and second base station modules over the communication link, to free communication resources for the said at least one of the first and second base station modules whereby said at least one of the first and second base station modules is able to provide wireless communication to the said at least one further mobile communications device using the freed communication resources.

The managing means may further comprise an interface module for coupling the first and second base station modules. The interface module may be internal to the apparatus.

The managing means may further be configured to provide at least one information element with regards to the communication resources over the communication link of at least one of the first and second base station modules to the other one of the first and second base station modules, and may be configured to provide the at least one information element via the interface module.

When there is a shortage of communication resources over the communication link for at least one of the first and second base station modules to provide wireless communication to at least one further mobile communications device, the managing means may further be configured to perform a redirection of the wireless communication of at least one mobile communications device to a further base station, whereby to provide wireless communication to the said at least one further mobile communications device.

The first base station module and the second base station module may be mounted within a common housing. The communications apparatus may be a dual mode femto access point. At least one of the first and second base station modules may comprise a HNB and the other of the first and second base station modules may comprise a HeNB.

The managing means may comprise a Radio Access Network (RAN) Resource Management (RRM) module to perform a Transport Network Layer (TNL) Connection Admission Control (CAC) policy.

The communication link providing the communication resources to the communications network to the first and second base station modules may comprise a backhaul connection to a core network.

According to another aspect, the invention provides a system for use in a telecommunications network, comprising one or more mobile communications devices and a communications apparatus according to some aspects of the invention.

According to another aspect, the invention provides a mobile communications device for use with a communications apparatus comprising: a first base station module for providing wireless communication to a communications network to one or more mobile communications devices within range of the first base station module; a second base station module for providing wireless communication to a communications network to one or more mobile communications devices within range of the second base station module; an interface for coupling the first base station module and the second base station module; wherein at least one of the first and second base station modules is configured to exchange at least one information element with the other one of the first and second base station modules via said interface, and wherein the mobile communications device is arranged to communicate a communications network via one of the first and second base station modules of the communications apparatus.

According to one aspect, the invention provides a method, performed in a telecommunications network, for facilitating the share of communication resources over a communication link to a communications network to a first and a second base station modules of a telecommunications apparatus, the method comprising managing the communication resources of at least one of the first and the second base station modules.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

BRIEF DESCRIPTION OF THE DRAWINGS

Embodiments of the invention will now be described, by way of example, with reference to the accompanying drawings, in which:

FIG. 7 is a diagram illustrating yet another an exemplary method performed by the telecommunication system of FIG. 1.

DETAILED DESCRIPTION OF EXEMPLARY EMBODIMENTS

Although for efficiency of understanding for those of skill in the art, embodiments and implementations of the invention will be described in detail in the context of a 3G system (UMTS, LTE), the principles of the invention can be applied to other systems (such as WiMAX) in which mobile devices or User Equipment (UE) communicate with one of several base stations with the corresponding elements of the system changed as required.

Overview

Figure 1:
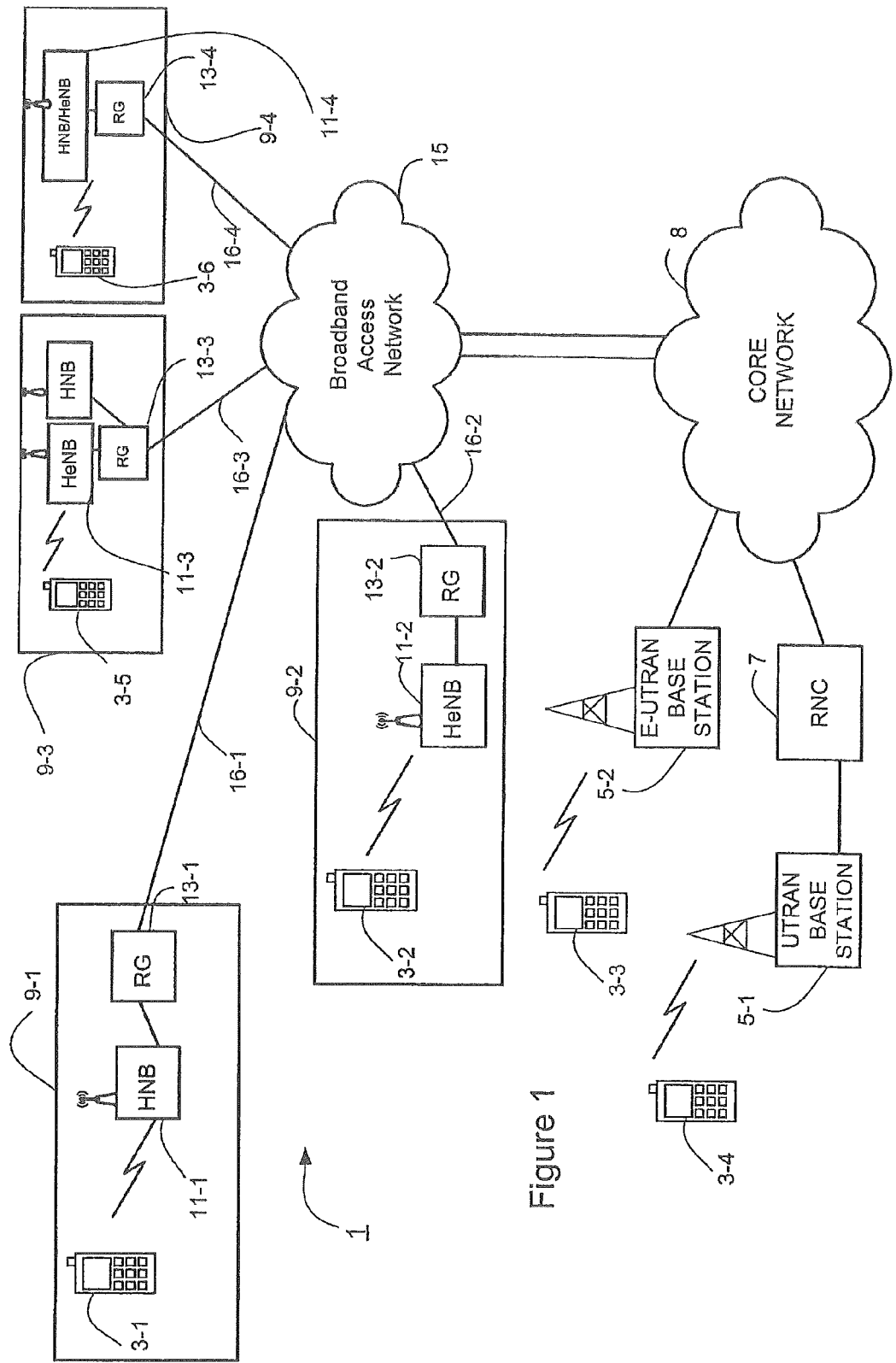
FIG. 1 schematically illustrates a mobile telecommunication system.

FIG. 1 schematically illustrates a mobile (cellular) telecommunication system 1 in which users of User Equipments (UE) such as mobile telephones 3-1 to 3-6 or other mobile communications devices can communicate with other users via different access nodes. In particular, mobile telephones 3 (or other user equipment UE) can make connections with the mobile telephone core network 8 directly via a Universal Terrestrial Radio Access Network (UTRAN) base station 5-1 and associated Radio Network Controller (RNC) 7 or an evolved UTRAN (E-UTRAN) base station 5-2. Mobile telephones 3 can also connect to the mobile telephone core network 8 using a 'home' base station (HNB) provided in a user's commercial or private residence 9. Each HNB or HeNB 11 (i.e. HNB 11-1, HeNB 11-2, HNB/HeNB 11-3 and HNB/HeNB 11-4) is coupled, by a residential gateway 13 and a broadband access network 15 (conforming to the BroadBand Forum, BBF) to provide the HNB or HeNB with a backhaul communication line or link with an available bandwidth to the mobile telephone core telephone network 8.

In the example illustrated in FIG. 1, the mobile telephone 3-1 is connected to the core network 8 via the HNB 11-1; the mobile telephone 3-2 is connected to the core network 8 via HeNB 11-2; the mobile telephone 3-3 is connected to the core network 8 via E-UTRAN base station 5-2; the mobile telephone 3-4 is connected to the core network 8 via UTRAN base station 5-1, the mobile telephone 3-5 is connected to the core network 8 via the dual mode base HNB/HeNB or dual femto access point 11-3; and the mobile telephone 3-6 is connected to the core network 8 via the dual mode base HNB/HeNB or dual FAP 11-4.

In the example of FIG. 1, the residential gateways 13 connect to the broadband access network 15 via an ADSL or cable connection 16 and the HNBs and HeNBs are programmed with the IP address of a security gateway (not shown) within the core network 8 so that the HNBs and HeNBs initially connect to the preprogrammed security gateway. In this embodiment, the residential gateway 13 of a user's commercial or private residence 9 assigns the HNB or HeNB 11 a local IP address in the broadband access network 15, which the HNB or HeNB 11 will use in its communications with the core network 8.

Advantageously, the dual FAP 11-3, 11-4 is operable to control the communication resources, available over the backhaul link between the core network 8 and the dual FAP, in order to optimise the total communication resources available to the dual FAP 11-3, 11-4 in the uplink and/or downlink by ensuring that the available communication resources are balanced between the HNB part of the dual FAP 11-3, 11-4 and the HeNB part of the dual FAP 11-3, 11-4.

Specifically, the dual FAP 11-3, 11-4 is operable to manage the communication resources (e.g. Transport Network Layer (TNL) resources) of the HNB part and the HeNB part of the FAP to reduce the current communication resources available to a first of the home base station parts (e.g. HeNB or HNB respectively) in order to free communication resources for the second, coexisting, home base station part (e.g. HNB or HeNB respectively) thereby allowing a mobile telephone 3 to be admitted even when the aggregate traffic to the coexisting base station part exceeds 50% of the total backhaul bandwidth available to the dual FAP 11-3, 11-4.

It can be seen, therefore, that this flexible partitioning of the communication resources is advantageous over the alternative possibility in which the available bandwidth is shared evenly between the HNB and HeNB parts. Specifically, the flexible partitioning of the communication resources helps to ensure effective utilisation of the backhaul bandwidth because the communication resources effectively form a common or 'shared' communication resource pool. Fixed partitioning, on the other hand, would result in a relatively ineffective utilisation of the backhaul bandwidth, for example because if a predetermined proportion (say 50%) of the bandwidth is reserved for HeNB traffic while the remaining proportion is reserved for HNB traffic, the HeNB will not be able to admit a call from a mobile telephone 3 after it has reached the predetermined allocated backhaul bandwidth even when there are backhaul resources still available for the HNB.

Furthermore, each home base station part (HNB and HeNB) of the dual FAP HeNB is able to control admission of new calls via the communication cell that it controls using a TNL Connection Admission Control (CAC) procedure that helps to ensures that the aggregate traffic does not exceed the available backhaul bandwidth in the uplink/downlink direction when admitting new communication bearers.

Advantageously, each home base station part is also able to perform pre-emptive congestion control in which, on determining that there is a shortage of available communication resources, the communication resources used by a particular mobile telephone 3 are reduced to allow admission communication by another mobile telephone 3. The pre-emptive congestion control may be internal to a particular home base station part (referred to as intra FAP pre-emption), in which a home base station experiencing a shortage of resources reduces the communication resources available to a mobile telephone 3 in its own communication cell. Advantageously, however, the pre-emptive congestion control may also be coordinated between the home base station parts (referred to as inter FAP pre-emption), in which a first home base station part experiencing a shortage of resources co-ordinates the congestion control procedure with the coexisting home base station part such that the coexisting home base station part reduces the communication resources available to a mobile telephone 3 in its communication cell so that resources can be made available to the first home base station part by virtue of the shared resource pool discussed previously.

When insufficient communication resources are available, despite the balancing of the available bandwidth, and the above congestion control procedures, the dual FAP 11-3, 11-4 redirects/hands over communication by a mobile telephone 3 to a neighbouring cell (e.g. a macro cell).

Home Base Station

Figure 2:
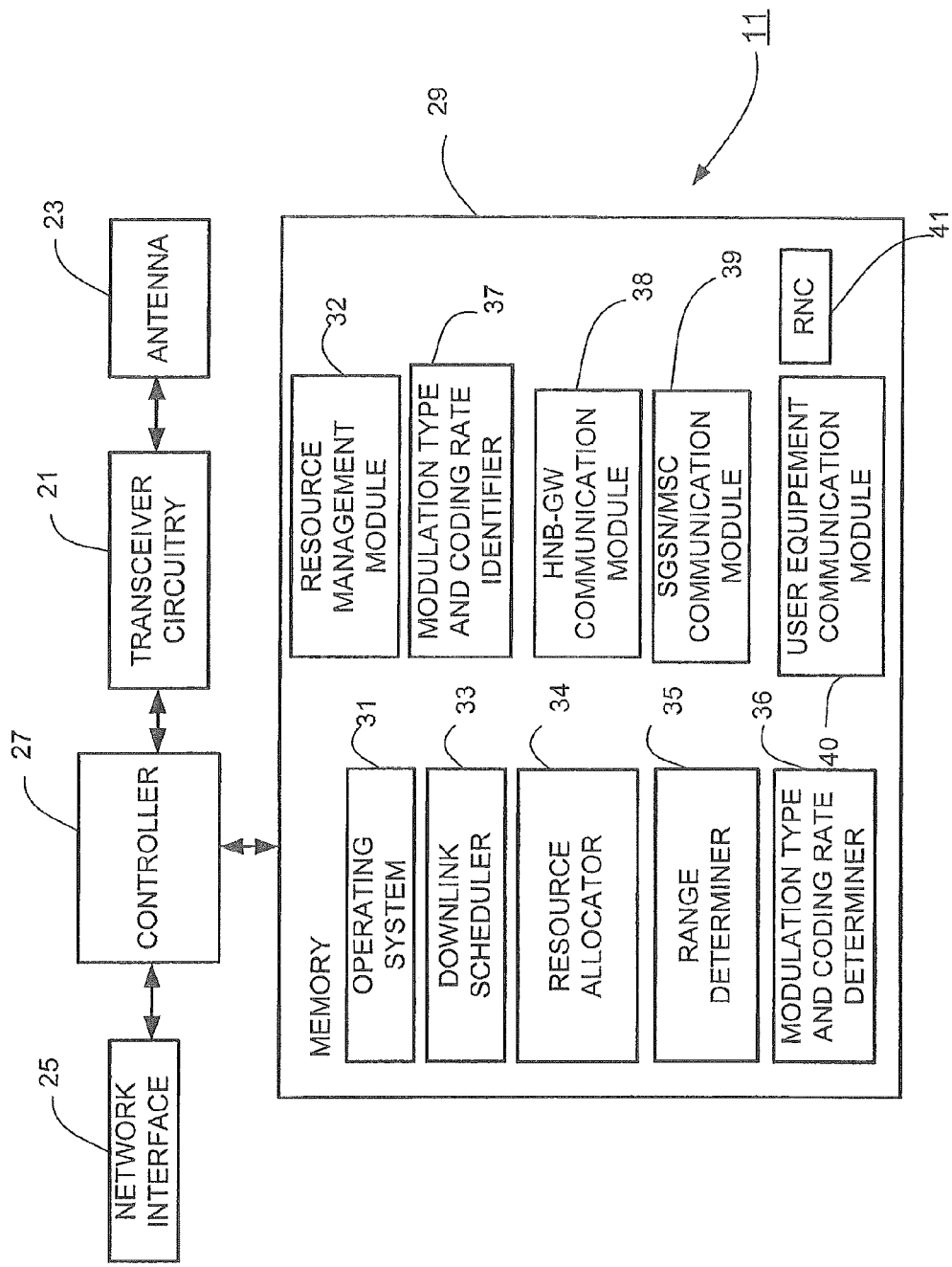
FIG. 2 shows a block diagram illustrating the main components of a base station, that is a home (e)NodeB communications node in a 3G system.

FIG. 2 shows block diagrams illustrating the main components of a HNB part of a dual FAP 11-3 or 11-4 in the 3G system 1. As shown in FIG. 2, each HNB 11 comprises at least a transceiver circuit 21 to transmit signals to and to receive signals from the mobile telephones 3 via one or more antennae 23 and to transmit signals to and to receive signals from the telephone network via a network interface 25, to provide the HNB with a backhaul communication line or link to the core network with an available bandwidth (also referred to as backhaul bandwidth). The transceiver circuit 21 is controlled by a controller 27 in accordance with software stored in memory 29.

The software includes, among other things, an operating system 31, a resource management module 32, a downlink scheduler 33 to schedule user data packets to be transmitted by the transceiver circuit 21 in communications with the mobile telephones 3, a resource allocator 34 to allocate frequency resources for use by the mobile telephones 3 for transmitting their uplink data to the base station.

In this example, the software further includes a range determiner 35 to determine the range of a mobile telephone from the base station, a modulation type and coding rate (MCS) determiner 36 to determine the modulation and coding rate to be used, a modulation type and coding rate scheme (MCS) identifier 37 to identify to a mobile telephone 3 the MCS of a control channel upon which the base station is attempting to communicate with the mobile telephone 3, an HNB-GW communication module 38; an SGSN/MSC communication module 39, a user equipment communication module 40. The HNB 11 further includes radio resource management functions provided by a standard Radio Network Controller RNC 41.

The resource management module 32 manages the communication resources available to the HNB over the backhaul link and performs congestion control, TNL Connection Admission Control for the HNB, and co-ordinates with the HeNB part to manage the communication resources of the shared pool as described above.

The HeNB part of the dual FAP 11-3 and 11-4 shown in FIG. 1 have similar components to those shown in FIG. 2. The main difference may be that there may not be an HNB-GW communication module 38 and instead of an SGSN (Serving GPRS Support Node)/MSC communication module 39, there may be an MME (Mobility Management Entity) communication module. Also, the HeNB do not communicate using the HNBAP (Home Node B Application Part) protocol, but using the E-UTRAN protocols such as the S1AP (S1 Application Protocol) protocol.

User Equipment

Figure 3:
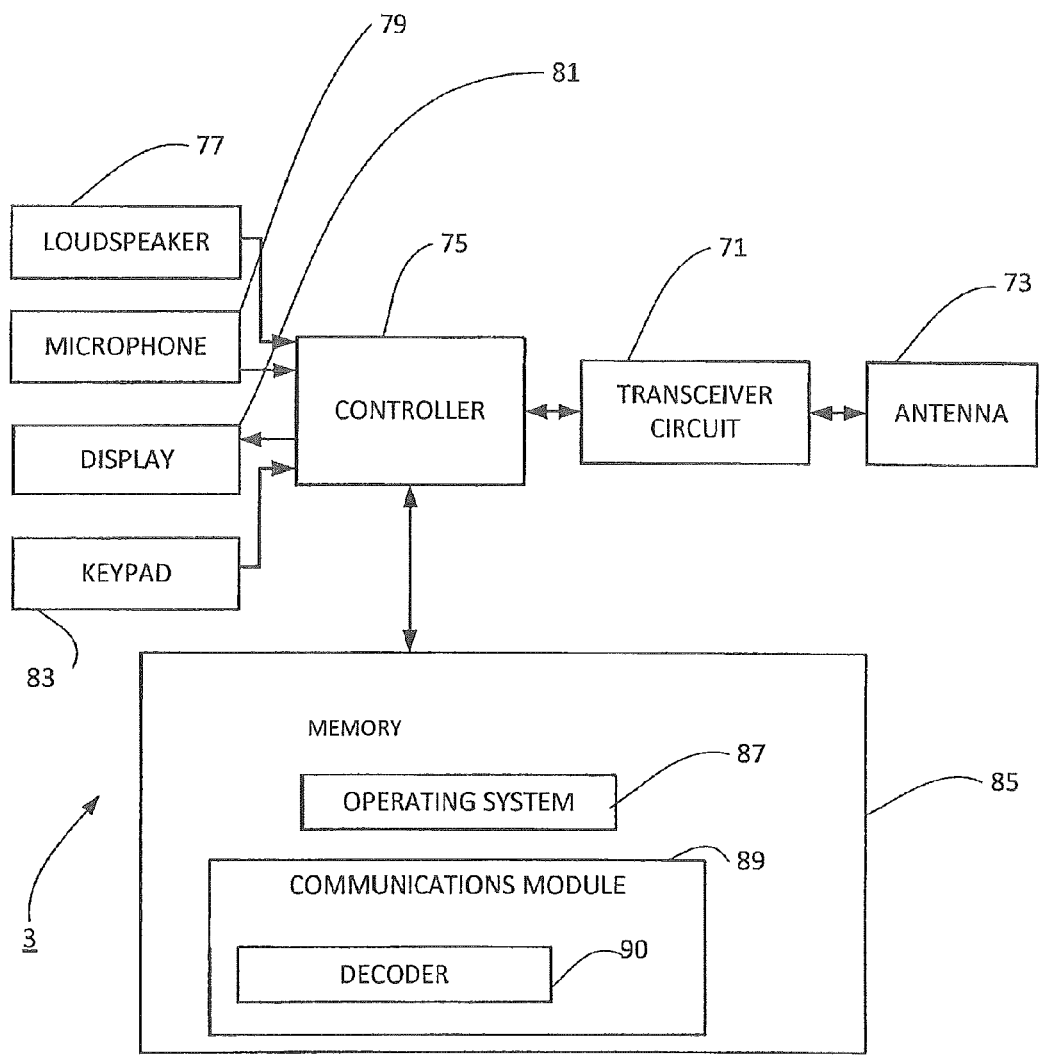
FIG. 3 illustrates schematically the main components of a UE of the telecommunication system of FIG. 1.

FIG. 3 illustrates schematically the main components of a mobile telephone 3 shown in FIG. 1. As shown in FIG. 3, each mobile telephone 3 includes a transceiver circuit 71 to transmit signals to and to receive signals from the base stations 5 or 11 via one or more antennae 73. As shown, the mobile telephone 3 also includes a controller 75 to control the operation of the mobile telephone 3. The controller 75 is connected to the transceiver circuit 71 and to a user interface having, in this example, a loudspeaker 77, a microphone 79, a display 81, and a keypad 83. The controller 75 operates in accordance with software instructions stored within memory 85. As shown, these software instructions include, among other things, an operating system 87 and a communications module 89 having a decoder 90 to perform decoding on a downlink (DL) control channel.

Dual FAP Architectures

Figure 4A:
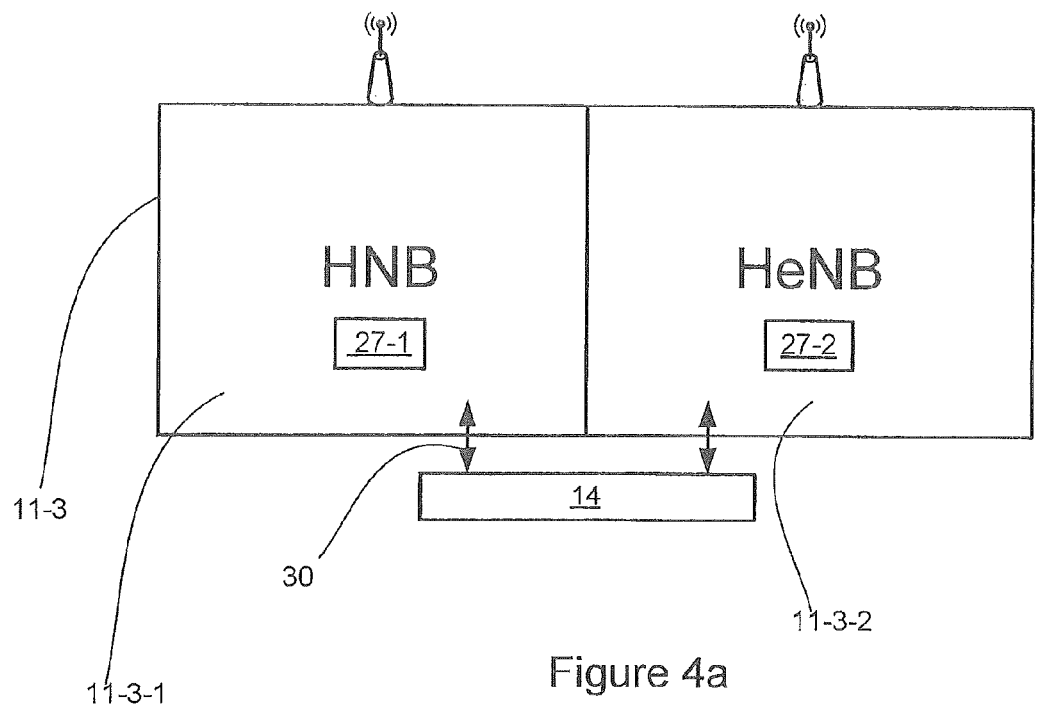
FIG. 4a schematically illustrates an example of an architecture for a dual mode FAP of the telecommunication system of FIG. 1.
Figure 4B:
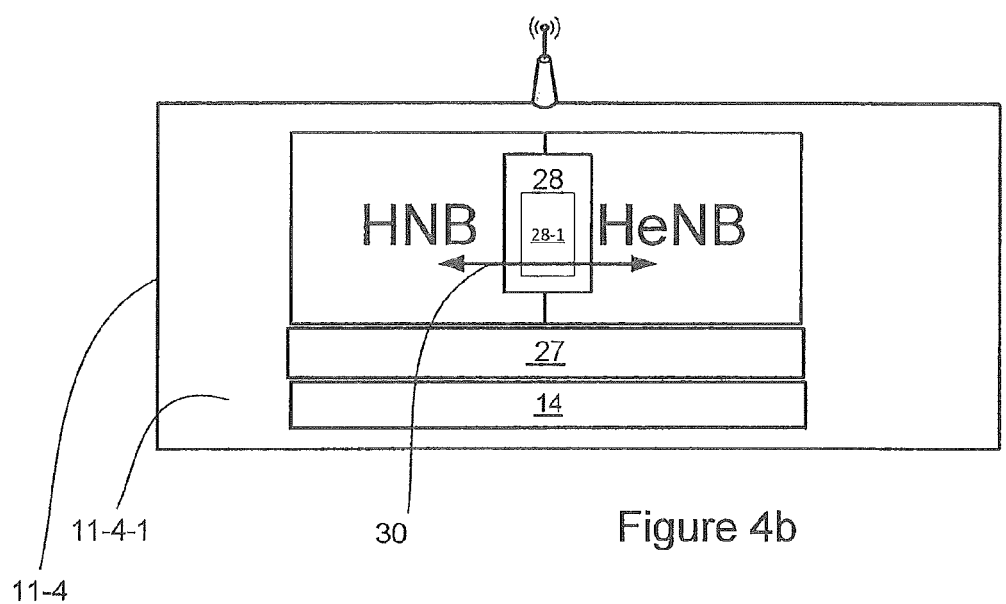
FIG. 4b schematically illustrates another example of an architecture for a dual mode FAP of the telecommunication system of FIG. 1.

FIGS. 4*a* and 4*b* schematically illustrate two examples of architectures for the dual FAP 11-3 and 11-4 of FIG. 1.

FIG. 4*a* schematically illustrates an example of an architecture for the dual FAP 11-3 of FIG. 1, in which each home base station part of the dual FAP comprises a separate controller module 27-1, 27-2. In this example, each separate controller module 27-1 and 27-2 may be considered as part of separate baseband chipset 11-3-1 and 11-3-2 respectively.

FIG. 4*b* schematically illustrates an example of an architecture for the dual FAP 11-4 of FIG. 1, where the both home base station parts of the dual FAP comprise a single shared controller module 27. In this example, the controller module 27 can be considered as part of a single baseband chipset 11-4-1 for both the HNB and the HeNB. The two home base stations HNB and HeNB of the dual FAP are connected by an interface module 28, sometimes referred to as an internal interface. The interface module may further comprise at least one controller module 28-1.

The dual FAPs 11-3, 11-4, shown in FIGS. 4*a* and 4*b* each comprise an FAP resource management module 14 which works with the resource management modules 32 of each home base station part of the dual FAP to manage the combined communication resources available to the dual FAP over the backhaul link. The FAP resource management module 14 flexibly partitions the communication resources made available to each home base station part in dependence on their relative congestion status. For example, if the HeNB part is congested but the HNB part is not then the HeNB part will be provide with access to greater than half the available bandwidth and vice versa.

In FIGS. 4*a* and 4*b*, the first home base station part and the second home base station part are mounted within a common housing.

The first home base station part and the second home base station part form part of communications apparatus comprising a dual mode femto access point (FAP).

Operation

Examples of methods used for managing the communication resources the home base station parts of the dual FAP to the communications network, will now be described. Although for efficiency of understanding for those skilled in the art, the invention will be described in detail in the context of two home base stations (HNB and HeNB) of a dual FAP, the principles described herein can be applied to a multi-mode FAP comprising more than two home base stations with the corresponding elements of the system changed as required.

Figure 5:
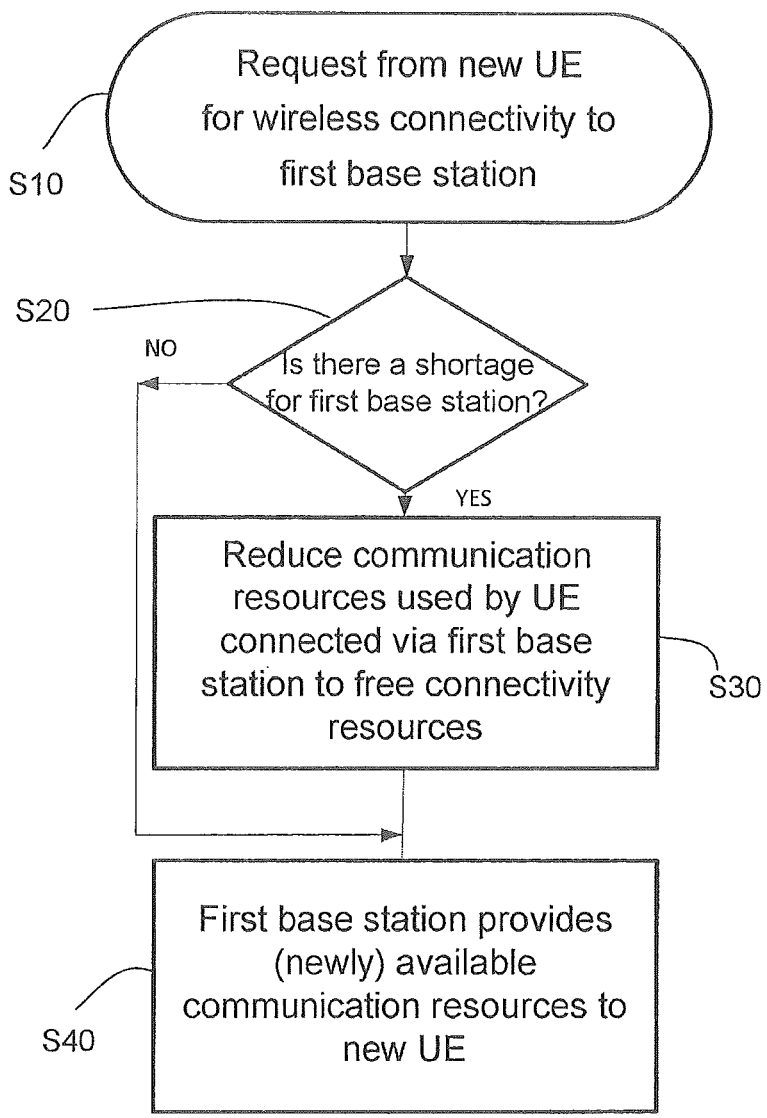
FIG. 5 is a diagram illustrating an exemplary method performed by the telecommunication system of FIG. 1.

FIG. 5 is a flow diagram illustrating a simplified process for resource management including intra FAP pre-emption that may be performed by either home base station part. In step S10, a mobile telecommunication device requests wireless communication to the network to a first of the home base station parts. In S20, the resource management module 32 of the first home base station determines if there is a shortage of available communication resources over the backhaul link for the first base station part (e.g. by determining if all the resources on the backhaul link are used by the first base station for other devices or if there is still some available bandwidth to admit the new device).

If there is no shortage, then the first base station part can provide access to the new mobile telephone 3 in S40.

If there is a shortage, then in S30 the resource management module controls the communication resources of the first home base station part, to reduce the current communication resources in use by the first home base station part over the backhaul link, to free communication resources so that the first home base station part is able to provide wireless communication to the new device. The first base station can then provide access to the new mobile telephone 3 in S40 as already described. In this example, if the first base station comprises a HeNB, the current communication resources used are reduced only for other mobile telephones 3 operating in accordance with the LTE standards in the LTE (E-UTRAN) cell of the HeNB. If the first base station comprises a HNB, the current communication resources used are reduced only for other mobile telephones 3 operating in accordance with the UMTS ('3G') standards in the UMTS (UTRAN) cell of the HNB.

Figure 6:
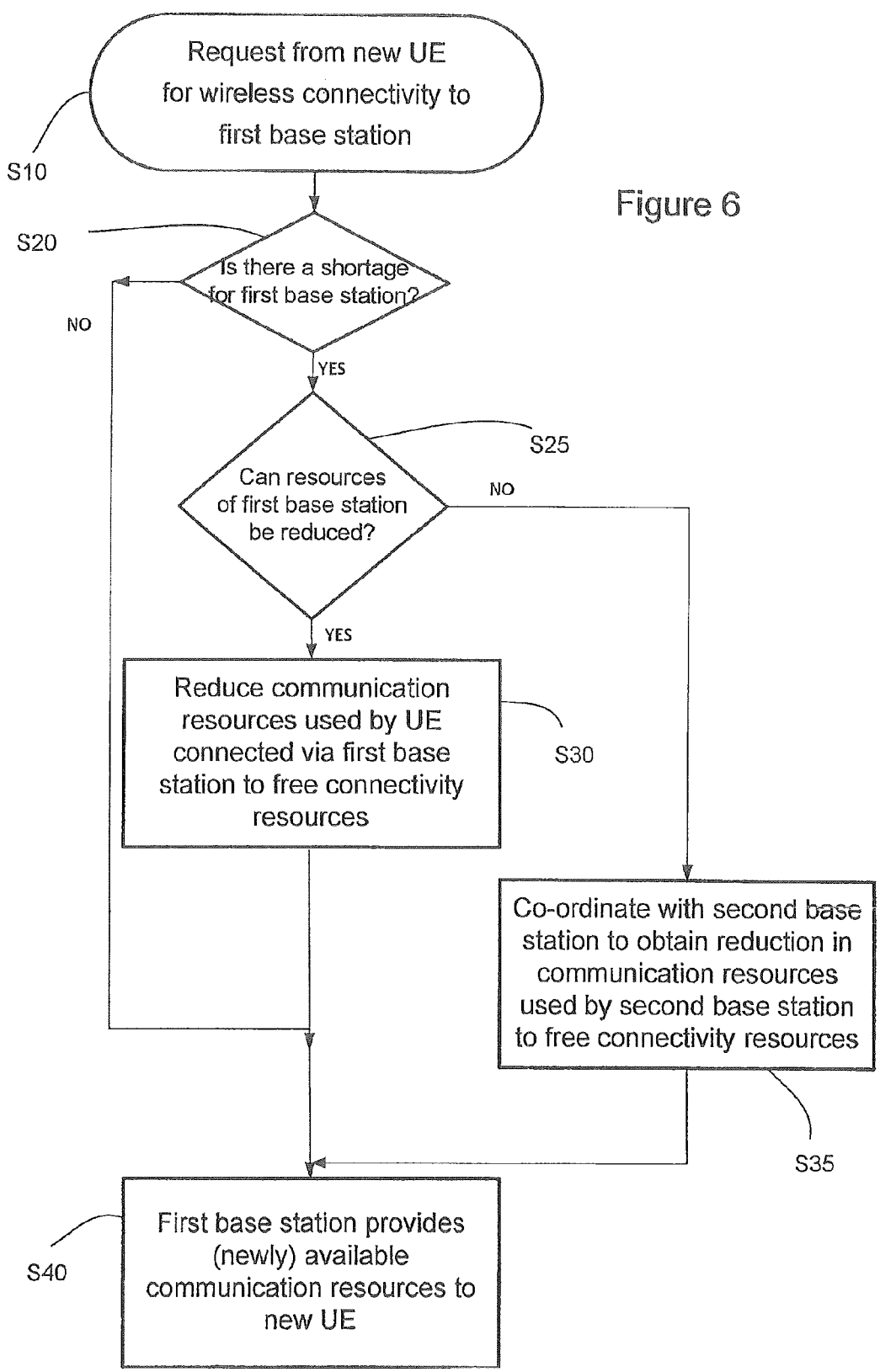
FIG. 6 is a diagram illustrating another an exemplary method performed by the telecommunication system of FIG. 1.

FIG. 6 is a flow diagram illustrating a simplified process for resource management including intra FAP pre-emption and inter FAP pre-emption that may be performed by either home base station part. In step S10, a mobile telecommunication device requests wireless communication to the network to a first of the home base station parts. In S20, the resource management module 32 (FIG. 2) of the first home base station determines if there is a shortage of available communication resources over the backhaul link for the first base station part (e.g. by determining if all the resources on the backhaul link are used by the first base station for other devices or if there is still some available bandwidth to admit the new device). If there is no shortage, then the first base station part can provide access to the new mobile telephone 3 in S40.

If there is a shortage, then in S25 the resource management module 32 determines if the amount of current communication resources used by the first home base station part over the link should be reduced or not.

If the current communication resources used by the first home base station part over the link can be reduced, then intra FAP pre-emption follows. Specifically, as described previously, then in S30 the resource management module 32 controls the communication resources of the first home base station part, to reduce the current communication resources in use by the first home base station part over the backhaul link, to free communication resources so that the first home base station part is able to provide wireless communication to the new device. The first base station can then provide access to the new mobile telephone 3 in S40 as already described.

If at S25 it is determined that the current communication resources used by the first home base station part over the link should not or cannot be reduced (for example, when all the available resources are in use by the second coexisting base station part), then in S35 the resource management module 32 of the first home base station part communicates with the resource management module 32 of the second home base station part to co-ordinate a reduction in the communication resources being used by the coexisting home base station part over the backhaul. Thus, the resource management module 32 of the coexisting home base station part controls the communication resources of the coexisting home base station part, to reduce the communication resources currently in use to free communication resources so that the first home base station part is able to provide wireless communication to the new device. The first base station part can then provide access to the new mobile telephone 3 in S40 as already described. S35 may be referred as the Inter FAP pre-emption method.

In order to be able to control the communication resources of the second home base station part to free communication resources for the first home base station part, the resource management module may further comprise an interface module 28 (FIG. 4b) for coupling the first and second home base station parts. The interface module may allow exchange of information between the HNB and the HeNB of the dual FAP, and may be internal to the apparatus. The information exchanged over the interface module 28 may be at least one information element with regards to the communication resources over the link of at least one of the first and second home base station parts.

FIG. 7 is a flow diagram illustrating a simplified process for resource management including intra FAP pre-emption, inter FAP pre-emption and redirection/handover, that may be performed by either home base station part. In step S10, a mobile telecommunication device requests wireless communication to the network to a first of the home base station parts. In S20, the resource management module 32 of the first home base station determines if there is a shortage of available communication resources over the backhaul link for the first base station part (e.g. by determining if all the resources on the backhaul link are used by the first base station for other devices or if there is still some available bandwidth to admit the new device). If there is no shortage, then the first base station part can provide access to the new mobile telephone 3 in S40.

If there is a shortage, then in S25 the resource management module 32 determines if the amount of current communication resources used by the first home base station part over the link should be reduced or not.

If the current communication resources used by the first home base station part over the link can be reduced, then intra FAP pre-emption follows. Specifically, as described previously, then in S30 the resource management module 32 controls the communication resources of the first home base station part, to reduce the current communication resources in use by the first home base station part over the backhaul link, to free communication resources so that the first home base station part is able to provide wireless communication to the new device. The first base station can then provide access to the new mobile telephone 3 in S40 as already described.

If at S25 it is determined that the current communication resources used by the first home base station part over the link should not or cannot be reduced (for example, when all the available resources are in use by the second coexisting base station part), the resource management module 32 of the first home base station part communicates with the resource management module 32 of the second home base station part in an attempt to secure additional communication resources. In S32 the resource management module 32 of the first home base station part determines, from the communication with the coexisting home base station part, if the amount of current communication resources used by the second home base station part over the link should/can be reduced or not.

If at S32 it is determined that the current communication resources used by the second home base station part over the link can be reduced, then in S35 the resource management module 32 of the first home base station part communicates with the resource management module 32 of the second home base station part to co-ordinate a reduction in the communication resources being used by the coexisting home base station part over the backhaul. Thus, the resource management module 32 of the coexisting home base station part controls the communication resources of the coexisting home base station part, to reduce the communication resources currently in use to free communication resources so that the first home base station part is able to provide wireless communication to the new device. The first base station part can then provide access to the new mobile telephone 3 in S40 as already described. S35 may be referred as the Inter FAP pre-emption method.

If the current communication resources used by the second home base station part over the link may not be reduced, the resource management module is further configured to performed in S50 a redirection/handover, to another base station, either of the device attempting to make the connection, or of an existing connected device to free up communication resources for the new device. The base station to which the request is redirected may be a macro cell in which the dual FAP is operating.

In all the examples above, the resource management module may comprise a Radio Access Network (RAN) Resource Management (RRM) module to perform a Transport Network Layer (TNL) Connection Admission Control (CAC) policy.

Examples or aspects of the present invention address or at least ameliorate the issue of the existing dual mode FAP. Some examples of the present invention are advantageous in the case wherein the communication resources are common to the first and second home base station parts, and have a bandwidth which is shared between the first and second home base station parts. Control of the TNL resources of the first and second base station and flexible partitioning of the TNL resources result in a more effective utilisation of the backhaul bandwidth, as the TNL resources might be considered as a common pool.

Modifications and Alternatives

Detailed embodiments have been described above. As those skilled in the art will appreciate, a number of modifications and alternatives can be made to the above embodiments whilst still benefiting from the inventions embodied therein.

In the above embodiments, a mobile telephone based telecommunications system was described. As those skilled in the art will appreciate, the signalling techniques described in the present application can be employed in other communications system. Other communications nodes or devices may include user devices such as, for example, personal digital assistants, laptop computers, web browsers, etc.

In the embodiments described above, the mobile telephone and the HNB or HeNB each include transceiver circuitry. Typically this circuitry will be formed by dedicated hardware circuits. However, in some embodiments, part of the transceiver circuitry may be implemented as software run by the corresponding controller.

It should of course be appreciated that, although not explicitly shown in FIGS. 2, 3 and 4a and 4b the base stations 11 and mobile telephones 3 will have all of the functionality necessary to enable them to operate as base stations and mobile telephones, respectively, in the particular system in which they are designed to function. It should also be appreciated that FIGS. 2, 3 and 4a and 4b are functional block diagrams and that in practice the individual blocks shown in FIGS. 2, 3 and 4a and 4b may exist as discrete elements or their functionality may be distributed or not individually discernable. As an example, the modules 31 to 41 of FIG. 2 may or may not be separate software modules and may or may not be provided within the resource allocator functionality.

Although the above description of FIGS. 2, 3 and 4a and 4b indicates that the described functionality is provided by software, it should be appreciated that the functionality of a mobile telephone or base station may be provided, where appropriate, by hardware, software, firmware or any combination thereof. As an example, the functionality performed by part or all of the above-described software may be performed using one or more dedicated hardware circuits. A software implementation may however be preferred to facilitate the updating of the functionality of a base station 11 or mobile telephone 3.

Where software modules are provided, they may be provided, as appropriate, in compiled or un-compiled form and may be supplied to the base station or to the mobile telephone, as the case may be, as a signal over a computer or telecommunications network, or on a computer storage medium such as for instance a CD ROM.

Various other modifications will be apparent to those skilled in the art and will not be described in further detail here.

For instance, the base stations of the multimode femto access point might implement any of the example alone or any combination of the examples, depending on the circumstances and the conditions.

With reference to FIGS. 2 and 4a, the resource management modules 14, 32 for managing the communication resources may be implemented in hardware or software and may comprise a controller which is located at least partially external to the dual FAP (i.e. at least partially located outside the common housing of the FAP).

Also, the transfer of information between the two base stations of the FAP was described as performed over an internal interface module. It can also be performed via a common memory (for instance a common operation and maintenance (OAM) module in the FAP) or at least via external means, for instance performing a SON transfer protocol compliant to 3GPP TS 36.413 V10.3.0 and 3GPP TS 48.018 V10.3.0.

This application is based upon and claims the benefit of priority from United Kingdom patent application No. 1120969.9, filed on Dec. 6, 2011, the disclosure of which is incorporated herein in its entirety by reference.

The invention claimed is:

1. A dual base station access point including first and second base station modules each of which includes communication resources available with a backhaul link on a transport network layer (TNL), comprising:
    a network interface which connects the first and the second base station modules to a communication network via the backhaul link; and
    a controller which manages the available communication resources over the backhaul link between the communication network and a femto access point (FAP) on the transport network layer,
    wherein, when a decision is made about a shortage of the available communication resources in a selected base station module of the first and the second base station modules, the controller is configured to connect the communication resources of the selected base station module by reducing the communication resources of the selected base station module while, when the communication resources cannot be reduced in the selected second base station module, the controller is configured to connect the communication resources by reducing the communication resources of another base station module except the selected base station module.

2. A dual base station access point according to claim 1, wherein the controller is further configured to share said communication resources between said first base station module and said second base station module such that communication resources that are not being used by the first base station module are available to be used by the second base station module and vice versa.

3. A dual base station access point according to claim 1, wherein, when there is the shortage of the available communication resources in the selected base station module of the first and the second base station modules, the controller is further configured to manage the communication resources of the selected base station module of the first and the second base station modules, to reduce current communication resources used by the selected base station module of the first and the second base station modules, to free communication resources, whereby the selected base station module of the first and the second base station modules is able to provide wireless communication to the at least one further mobile communications device using the freed communication resources.

4. A dual base station access point according to claim 1, wherein, when there is the shortage of the available communication resources in the selected base station module of the first and the second base station modules, the controller is configured to control the communication resources of the another base station module, to reduce current communication resources used by the another base station module, to free communication resources for the selected base station module of the first and the second base station modules, whereby the selected base station module of the first and the second base station modules is able to provide wireless communication to the at least one further mobile communications device using the freed communication resources.

5. A dual base station access point according to claim 4, wherein the controller further comprises an interface module that couples the first base station module and said second base station module.

6. A dual base station access point according to claim 5, wherein the interface module is internal to the dual base station access point.

7. A dual base station access point according to claim 5, wherein the controller is further configured to provide at least one information element with regards to the communication resources over the backhaul link of the selected base station module of the first and the second base station modules to the another base station module, and
wherein the controller is configured to provide the at least one information element via the interface module.

8. A dual base station access point according to claim 1, wherein, when there is the shortage of the available communication resources in the selected base station module of the first and the second base station modules, the controller is further configured to perform a redirection of wireless communication of at least one mobile communications device to a further base station, to provide wireless communication to the at least one further mobile communications device.

9. A dual base station access point according to claim 1, wherein the first base station module and the second base station module are mounted within a common housing.

10. A dual base station access point according to claim 1, wherein the communications apparatus comprises the dual mode femto access point.

11. A dual base station access point according to claim 1, wherein at least one of the first base station module and the second base station module comprises an HNB and an other of the first base station module and the second base station module comprises an HeNB.

12. A dual base station access point according to claim 1, wherein the controller comprises a Radio Access Network (RAN) Resource Management (RRM) module to perform a Transport Network Layer Connection Admission Control (CAC) policy.

13. A dual base station access point according to claim 1, wherein the backhaul link providing the communication resources to the communications network to the first base station module and the second base station module comprises a backhaul connection to a core network.

14. A system for use in a telecommunications network, comprising one or more mobile communications devices and a dual base station access point according to claim 1.

15. A dual base station access point according to claim 1, wherein the controller manages the communication resources on the TNL through two stages of reducing the communication resources in the selected base station module and thereafter reducing the communication resources of said another base station module.

16. A mobile communications device for use with a dual base station access point, wherein the dual base station access point comprises:
a first base station module, forming an integral part of said dual base station access point, configured to operate independently as a first base station to provide wireless communication to a communications network to one or more mobile communications devices within a range of the first base station module;
a second base station module, forming an integral part of said dual base station access point, configured to operate independently as a second base station to provide wireless communication to a communications network to one or more mobile communications devices within a range of the second base station module;
an interface, forming an integral part of said dual base station access point, that couples the first base station module and the second base station module; and
a controller, forming an integral part of said dual base station access point, configured to manage an availability of communication resources, over a backhaul communication link on a transport network layer (TNL), to be used by said first base station module and said second base station module for providing said wireless communication to the communications network to at least one mobile communications device,
wherein, when a decision is made about a shortage of the available communication resources in a selected base station module of the first and the second base station modules, the controller is configured to connect the communication resources of the selected base station module by reducing the communication resources of the selected base station module while, when the communication resources cannot be reduced in the selected second base station module, the controller is configured to connect the communication resources by reducing the communication resources of another base station module except the selected base station module,
wherein the selected base station module is configured to exchange at least one information element with the another base station module via said interface, and
wherein the mobile communications device is arranged to communicate in a communications network via one of said first base station module and said second base station module of the dual base station access point.

17. A method, performed in a telecommunications network, for facilitating a share of communication resources over a backhaul communication link on a transport network layer (TNL) to a communications network to a first base station module, forming an integral part of a dual base station access point and configured to operate independently as a first base station, and a second base station module, forming an integral part of said dual base station access point and configured to operate independently as a second base station, the method comprising:
managing the communication resources of the selected base station module in the dual base station access point,
wherein, when a decision is made about a shortage of the available communication resources in a selected base station module of the first and the second base station modules, the managing is performed to connect the communication resources of the selected base station module by reducing the communication resources of the selected base station module while, when the communication resources cannot be reduced in the selected second base station module, the managing is performed to connect the communication resources by reducing the communication resources of another base station module except the selected base station module.

18. A method according to claim 17, wherein the managing the communication resources is performed by a controller that manages an availability of the communication resources, provided by a network interface over the backhaul communication link and to be used by said first base station module and said second base station module for providing a wireless communication to the communications network to at least one mobile communications device.

19. A method according to claim 17, wherein the controller shares said communication resources between said first base station module and the second base station module such that communication resources that are not being used by the first base station module are available to be used by the second base station module and vice versa.

20. A method according to claim 17, wherein, when there is the shortage of the available communication resources in the selected base station module of the first and the second base station modules, the controller manages the communication resources of the selected base station module of the first and the second base station modules, to reduce current communication resources used by the selected base station module of the first and the second base station modules, to free communication resources, whereby the selected base station module of the first and the second base station modules is able to provide wireless communication to the at least one further mobile communications device using the freed communication resources.

21. A method according to claim 17, wherein, when there is the shortage of the available communication resources in the selected base station module of the first and the second base station modules, the controller controls the communication resources of the another base station module, to reduce current communication resources used by the another base station module, to free communication resources for the selected base station module of the first and the second base station modules, whereby the selected base station module of the first and the second base station modules is able to provide wireless communication to the at least one further mobile communications device using the freed communication resources.

22. A method according to claim 17, wherein the controller further provides at least one information element with regards to the communication resources over the backhaul communication link of the selected base station module of the first and the second base station modules to the another base station module, and wherein the controller provides the at least one information element via an interface module.

23. A method according to claim 17, wherein, when there is the shortage of the available communication resources in the selected base station module of the first and the second base station modules, the controller further performs a redirection of the wireless communication of at least one mobile communications device to a further base station, to provide wireless communication to the at least one further mobile communications device.

24. A method according to claim 17, wherein the controller comprises a Radio Access Network (RAN) Resource Management (RRM) module and performs a Transport Network Layer (TNL) Connection Admission Control (CAC) policy.

25. A non-transitory computer program product or computer readable medium comprising instructions for carrying out a method according to claim 17.

* * * * *